United States Patent
Eriksson et al.

(10) Patent No.: US 10,518,361 B2
(45) Date of Patent: Dec. 31, 2019

(54) METHOD OF MANUFACTURING A COMPONENT AND COMPONENT

(71) Applicant: Siemens Aktiengesellschaft, Munich (DE)

(72) Inventors: Jonas Eriksson, Finspong (SE); Andreas Graichen, Norrköping (SE)

(73) Assignee: Siemens Aktiengesellschaft, Munich (DE)

(*) Notice: Subject to any disclaimer, the term of this patent is extended or adjusted under 35 U.S.C. 154(b) by 19 days.

(21) Appl. No.: 15/524,326

(22) PCT Filed: Sep. 21, 2015

(86) PCT No.: PCT/EP2015/071570
§ 371 (c)(1),
(2) Date: May 4, 2017

(87) PCT Pub. No.: WO2016/078800
PCT Pub. Date: May 26, 2016

(65) Prior Publication Data
US 2017/0312858 A1    Nov. 2, 2017

(30) Foreign Application Priority Data
Nov. 21, 2014  (EP) .................... 14194304

(51) Int. Cl.
*B22F 3/105*    (2006.01)
*B22F 5/00*     (2006.01)
(Continued)

(52) U.S. Cl.
CPC ............ *B23K 28/02* (2013.01); *B22F 3/1055* (2013.01); *B22F 5/009* (2013.01); *B22F 5/04* (2013.01);
(Continued)

(58) Field of Classification Search
None
See application file for complete search history.

(56) References Cited

U.S. PATENT DOCUMENTS

2006/0003095 A1    1/2006  Bullen et al.
2011/0311389 A1*  12/2011  Ryan ............... B22F 3/1055
                                              419/27
(Continued)

FOREIGN PATENT DOCUMENTS

CN    101474676 A    7/2009
CN    103394693 A   11/2013
(Continued)

OTHER PUBLICATIONS

DE 10 2011 011325 machine translation (Year: 2011).*
(Continued)

*Primary Examiner* — Paul A Wartalowicz
*Assistant Examiner* — Stephani Hill
(74) *Attorney, Agent, or Firm* — Beusse Wolter Sanks & Maire

(57) ABSTRACT

A method of manufacturing of a component having the steps of manufacturing of a first segment for the component by a powder-bed manufacturing process, and the manufacturing of a second segment for the component originating from the first segment by an additive manufacturing process, such that the second segment projects by a projecting distance over at least one side face of the first segment. Furthermore, a component has the first segment being manufactured by the powder-bed manufacturing process and the second segment being manufactured by the additive manufacturing process, wherein the second segment projects by a projecting distance over at least one side face of the first segment.

11 Claims, 1 Drawing Sheet

(51) Int. Cl.
  *B22F 5/04* (2006.01)
  *B29C 70/78* (2006.01)
  *B33Y 10/00* (2015.01)
  *B22F 7/06* (2006.01)
  *B23K 26/342* (2014.01)
  *B23K 15/00* (2006.01)
  *B23K 26/34* (2014.01)
  *B23K 101/00* (2006.01)
  *B29L 31/08* (2006.01)
  *B23K 28/02* (2014.01)
  *B33Y 80/00* (2015.01)
  *B33Y 30/00* (2015.01)
  *F01D 9/02* (2006.01)

(52) U.S. Cl.
  CPC ............... *B22F 7/06* (2013.01); *B22F 7/062* (2013.01); *B23K 15/0086* (2013.01); *B23K 26/34* (2013.01); *B23K 26/342* (2015.10); *B29C 70/78* (2013.01); *B33Y 10/00* (2014.12); *B33Y 30/00* (2014.12); *B33Y 80/00* (2014.12); *F01D 9/02* (2013.01); *B22F 2003/1058* (2013.01); *B22F 2007/068* (2013.01); *B23K 2101/001* (2018.08); *B29L 2031/08* (2013.01); *F05D 2230/22* (2013.01); *F05D 2240/80* (2013.01); *Y02P 10/295* (2015.11)

(56) References Cited

U.S. PATENT DOCUMENTS

| | | |
|---|---|---|
| 2012/0201686 A1 | 8/2012 | Fromentin et al. |
| 2012/0266439 A1 | 10/2012 | Geiger |
| 2013/0195673 A1* | 8/2013 | Godfrey .................. B23P 15/04 416/241 R |
| 2013/0316183 A1* | 11/2013 | Kulkarni, Jr. ........... B23P 6/007 428/557 |
| 2014/0178206 A1 | 6/2014 | Goehler et al. |
| 2016/0076376 A1* | 3/2016 | Trickey ................ B23K 20/126 228/114 |
| 2017/0232518 A1* | 8/2017 | Shi .......................... B22F 3/105 419/7 |
| 2018/0141127 A1* | 5/2018 | Richard ................. B33Y 10/00 |

FOREIGN PATENT DOCUMENTS

| | | | | |
|---|---|---|---|---|
| CN | 103717347 A | | 4/2014 | |
| CN | 203764976 U | * | 8/2014 | |
| CN | 106735208 A | * | 5/2017 | .............. B22F 3/105 |
| DE | 202005001682 U1 | | 6/2005 | |
| DE | 102011011325 A1 | | 8/2012 | |
| DE | 102012020958 A1 | | 4/2014 | |
| EP | 2511030 A2 | | 10/2012 | |
| EP | 2756909 A1 | | 7/2014 | |
| JP | H02246255 A | | 10/1990 | |
| WO | 2014090907 A1 | | 6/2014 | |
| WO | 2014160310 A1 | | 10/2014 | |
| WO | WO-2016023255 A1 | * | 2/2016 | .............. B22F 3/105 |

OTHER PUBLICATIONS

CN 106735208 machine translation (Year: 2017).*
CN 203764976 machine translation (Year: 2014).*
International Search Report dated Feb. 17, 2016, for PCT/EP2015/071570.
IPRP (PCT/IPEA/416 and 409) dated Feb. 26, 2017, for PCT/EP2015/071570.
CN search report dated Apr. 10, 2018, for CN patent application No. 201580062776.9.

* cited by examiner

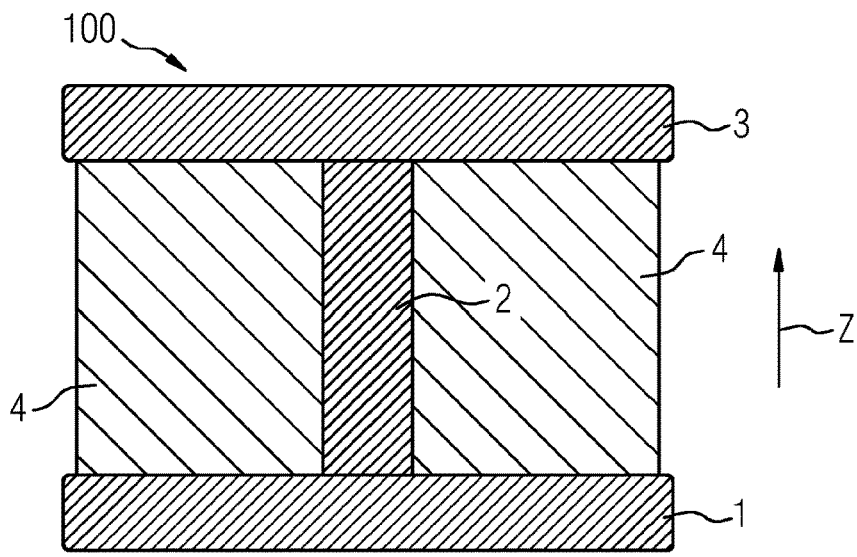
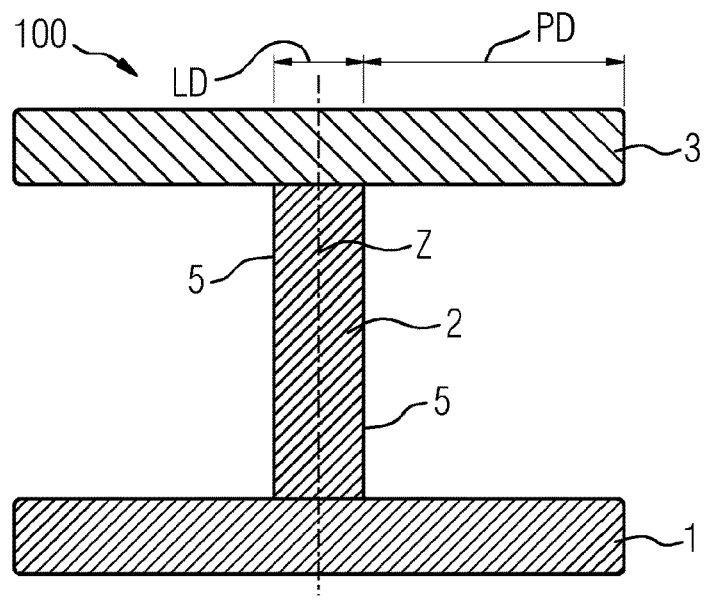
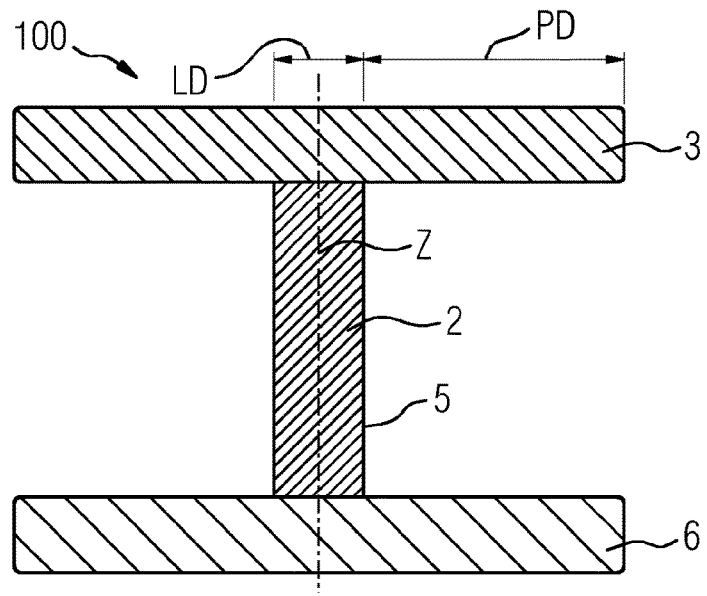

METHOD OF MANUFACTURING A COMPONENT AND COMPONENT

CROSS REFERENCE TO RELATED APPLICATIONS

This application is the US National Stage of International Application No. PCT/EP2015/071570 filed Sep. 21, 2015, and claims the benefit thereof. The International Application claims the benefit of European Application No. EP14194304 filed Nov. 21, 2014. All of the applications are incorporated by reference herein in their entirety.

FIELD OF INVENTION

The present invention relates to a method of manufacturing a component such as a guide vane of a turbine or component thereof and a corresponding component.

BACKGROUND OF INVENTION

Turbine components, such as vanes, particularly guide vanes are known to be fabricated or manufactured by means of additive manufacturing or corresponding processes. Therefore, powder-bed methods are conducted which, however, often require complicated support structures and post-processing. This, in turn, leads to unwanted or adverse surface properties. Said support structures pertain to "dead", "un-lean" or unwanted structures being solely necessary for the execution of the main manufacture. Moreover, said powder-bed methods may be limited to a single geometrical axis of buildup or manufacture. Alternative means such as laser cladding or laser metal deposition are, on the other hand, usually too inaccurate, particularly in terms of surface roughness and geometrical "resolution" of surface structures.

A method of laser cladding is described in EP 2 756 909 A1, for example.

DE 10 2011 011325 A1 describes a method for additive manufacturing or repair of a component.

WO 2014/090907 A1 pertains to a turbo machine blade, a corresponding turbo machine and a method of manufacturing the same.

US 2012/201686 A1 describes a method of producing a guide vane.

EP 2 511 030 A2 describes a method for manufacturing a component with at least one element arranged inside the component, as well as a corresponding component.

SUMMARY OF INVENTION

It is an object of the present invention to provide for an improved method of manufacturing, advantageously additively manufacturing of a component, such as a component for a guide vane of gas turbines or a corresponding guide vane, by which the mentioned drawbacks may be overcome.

The mentioned object is achieved by the subject-matter of the independent claims. Advantageous embodiments are subject matter of the dependent claims.

An aspect of the present disclosure relates to a method of manufacturing of a component comprising the steps of manufacturing of the first segment for the component by or by means of a powder-bed manufacturing process. The powder-bed manufacturing process is expediently an additive manufacturing process. The method further comprises manufacturing of the second segment for the component originating from or based on the first segment by or by means of an additive manufacturing process, such that the second segment projects or protrudes by a projecting or protruding distance over or beyond at least one side face of the first segment. Accordingly, the second segment may project or protrude over the mentioned side face or a side or outer edge in a plan view of the component or the second segment.

The manufacturing of the second segment may be performed directly onto the first segment by means of the mentioned additive manufacturing process. Advantageously, the manufacturing of the first segment and the manufacturing of the second segment are performed by different processes or methods. The projection may relate to an overhang structure or corresponding extension of the second segment. The mentioned side or side face advantageously denotes a lateral or circumferential side of the first segment, running around a longitudinal axis of the first segment, for example. Thus, an extension of the mentioned projection is directed or—in other words—the projection is extended along an axis being perpendicular to said longitudinal axis.

The manufacturing of the second segment is performed by means of a multi-axis manufacturing process, particularly laser cladding or laser metal deposition. As an advantage, during the fabrication or manufacture of e.g. a guide vane, the merits of both, the mentioned powder-bed manufacturing process and the additive or multi-axis manufacturing process may be exploited, wherein the disadvantages or drawbacks mentioned above may be overcome. Particularly, during the manufacture of the component, it may be abstained from complicated support structures to support the projecting material.

Moreover, it may advantageously get rid of said adverse surface properties that may be caused during later post-processing of the support structures.

In an embodiment the projecting distance amounts to at least double or twice of a lateral dimension of the first segment.

In an embodiment the projecting distance amounts to at least four times of the lateral dimension of the first segment.

In an embodiment the second segment projects, expediently by the projecting distance over or beyond at least two opposing side faces of the first segment. The second segment may project circumferentially, i.e. around the longitudinal axis of the first segment over all of the lateral sides or side faces of the first segment.

In an embodiment, the manufacturing or manufacture of the first segment is performed in a first apparatus and the manufacturing of the second segment is performed in a second apparatus being different from the first apparatus, and wherein, after the manufacturing of the first segment, the first segment is mounted off the first apparatus and mounted into the second apparatus for the subsequent manufacturing of the second segment. In other words, the first segment or component may be remounted. Although different manufacturing or fabrication apparatuses are used for the presented method, both techniques or apparatuses may be adjusted for easy and efficient remounting such that the manufacturing of the component may be performed in an efficient and easy way.

In an embodiment the manufacturing of the first segment and the manufacturing of the second segment is performed in the same apparatus. Therefore, the mentioned apparatus is expediently configured to be capable of performing both, powder-bed based as well as multi-axis manufacturing processes.

The first segment is manufactured by or by means of at least one of the following techniques: selective laser melting, electron beam melting, selective laser sintering. Advantageously, the first segment is manufactured by selective laser melting as this may be the most expedient process or technique as a powder-bed manufacturing process for the fabrication of guide vanes or comparable components.

The second segment is manufactured by laser cladding.

In an embodiment the second segment is manufactured by or by means of a robot- or CAD-controlled manufacturing process, such as laser cladding.

In an embodiment the first segment is manufactured, such as adaptively manufactured, onto a pre-fabricated or separate substrate or platform. The pre-fabricated substrate may be a platform for the component of an already used component or part thereof, such as an already used guide vane component of a gas turbine. As an advantage, the presented method may be used in repair applications for turbines, for example.

In an embodiment the first segment is directly manufactured without the use of a pre-fabricated or separate substrate or platform. According to this embodiment, the platform may be a new platform for the component or, alternatively, exhibit the platform itself.

In an embodiment the component is a part of a guide vane for a turbine, such as a gas turbine.

In an embodiment the component is a guide vane for a turbine, such as a gas turbine.

In an embodiment the first segment is an air foil of a turbine, such as a gas turbine.

Another aspect of the present disclosure relates to the component comprising the described first segment and the described second segment.

The component is advantageously manufactured or can be manufactured by the method as described. Features described herein above and below in conjunction with the method may, thus, also apply for the described component and vice versa.

The following aspects may relate to the present invention:

Aspect 1: Process of providing layer wise powder-bed of additive manufacturing with optimal accuracy and surface finish and combined with LMD process to avoid support structure and bad surface quality at downskin areas.

Aspect 2: Process of aspect 1, wherein a 5-axis LMD process is used.

BRIEF DESCRIPTION OF THE DRAWINGS

The present invention is further described hereinafter with reference to illustrated embodiments shown in the accompanying drawings, in which:

FIG. 1 shows a schematic of a component of the prior art.

FIG. 2 shows a schematic of a component fabricated according to an embodiment of the method described herein.

FIG. 3 shows a schematic of the component fabricated according to another embodiment of the method described herein.

DETAILED DESCRIPTION OF INVENTION

FIG. 1 shows schematically a component, particularly a guide vane component of the prior art. The component 100 comprises a lower platform 1. The lower platform 1 may be fabricated by any additive manufacturing process. The component further comprises an air foil 2 which may comprise a delicate or filigree structure. The lower platform 1 may constitute a substrate or platform for the air foil 2. The air foil 2 is, as it is to be manufactured with a certain accuracy and surface quality, advantageously manufactured by selective laser melting (SLM). For example, a laser cladding technique, such as laser metal deposition (LMD), does not allow for the required geometrical accuracy and may require additional post-processing, such as machining.

The component 100 further comprises an upper platform 3 which may be any part or subcomponent of the component 100 such as a component of a guide vane or a part of a casing of a gas turbine. The upper platform 3 is—due to the required geometric accuracy and resolution—typically also fabricated by SLM. As the upper platform 3 projects or protrudes at both lateral sides (left and right side in FIG. 1) far over a lateral extension (horizontal dimension) of the air foil 2, the manufacturing process requires an extensive use of support structure 4 supporting the overhanging or protruding structure or parts of the upper platform 3. Thereby, any projection or overhang may expediently be supported by a corresponding support structure or material in the SLM process.

The substrate or lower platform 1 and/or the air foil 2 may herein correspond or shall be associated with a first segment, and the upper platform 3 shall be associated with a second segment (see FIGS. 2 and 3 below).

FIG. 2 shows a schematic of the component 100 which has been or can be manufactured by the method of manufacturing as described herein. As shown, the component 100 comprises an "H"-shaped profile or cross-section. The component 100 comprises a lower platform or platform 1. The platform 1 may constitute a substrate or base part. The component 100 further comprises a first segment 2. The first segment 2 advantageously constitutes an air foil of or for the component 100. The first segment 2 comprises a side face 5 at opposing sides of the first segment 2 (cf. left and right side in FIG. 2). The side face 5 may as well denote a circumferential side face or circumferential side faces of the first segment 2. The first segment 2 comprises a lateral dimension indicated with LD in FIG. 2.

The first segment 2 is, advantageously, manufactured by or by means of a powder-bed manufacturing process such as SLM. This is intended in order to manufacture the component 100 with the required geometric accuracy or resolution as described above. Alternatively, the first segment 2 may be manufactured by electron beam melting or selective laser sintering, for example. The first segment 2 is, advantageously, manufactured or established along a longitudinal axis Z of the component 100 and/or of the first segment 2. The longitudinal axis Z may relate to a buildup-axis for the first segment 2 in the mentioned powder-bed manufacturing processes. The longitudinal axis Z is expediently perpendicular to the lateral dimension LD.

The platform 1 is advantageously manufactured along or together with the first segment 2 within the same process, such as SLM. To this effect, the platform 1 and the first segment 2, advantageously, constitute a monolithic part or subcomponent of the component 100 which is manufactured directly within the presented method without the use of any separate or pre-fabricated platform or substrate.

The component 100 further comprises a second segment 3. The second segment 3 may be an upper platform or outer platform or part, such as a casing, for the component 100. The second segment 3 is—after the manufacturing of the first segment 2 and/or the platform 1—continuously bonded to the first segment 2 in order to constitute the component 100. The second segment 3 is, advantageously, manufactured by or by means of multi-axis manufacturing process such as LMD or laser cladding.

Particularly, the second segment 3 is advantageously manufactured by a 5-axis, robot and/or CAD-(computeraided design) controlled LMD process. Alternatively, the second segment 3 may be manufactured by or by means of an 8-axis LMD process. The mentioned axes may relate to the degrees of freedom available in the corresponding techniques. Particularly, a base of the process as well as an according equipment apparatus may be movable along three perpendicular spatial directions. Moreover, said base may be tiltable or rotatable around two perpendicular axes of rotation, whereby eight geometrical degrees of freedom can be realized.

Alternatively, the second segment 3 may be manufactured by or by means of a powder-bed manufacturing process such as SLM. According to this embodiment, prior to the manufacturing of the second segment 3, the second segment 3 is, advantageously, also remounted or turned in an according apparatus, such that it may be abstained from (dead) support structures adversely complicating the manufacture.

As shown in FIG. 2, the second segment 3 overhangs, projects or protrudes by a projecting distance PD over or beyond at least one side face, advantageously all of the side faces 5 of the first segment 2. Accordingly the second segment, advantageously, projects over the mentioned side face(s) 5 or edges thereof when viewing the component and/or the second segment 3 in plan view (not shown).

The projecting distance PD, advantageously, amounts to at least double or twice of the lateral dimension LD, more advantageously the fourfold lateral dimension LD of the first segment 2. The larger the projecting distance PD, i.e. the more the second segment 3 projects over the side face 5 of the first segment 2 within the ready-manufactured component, the more favorable is the presented method in the fabrication of the component 100, e.g. for specific guide vane components.

Deviating from the schematics in the Figures showing uni-directional vertical side faces 5, the first segment 2 may be bent or curved according to the specific requirements of turbine guide vanes, for example. Advantageously, the first segment 2 comprises a thin and filigree structure according to an airfoil of a guide vane. Further, the geometry of the component 100 in FIG. 2 has to be perceived spatially such that the second segment 3 advantageously projects in the described way over each of the lateral side faces 5 of the first segment 2. Thus, the mentioned lateral dimension of the first segment may relate to a dimension in x-direction (horizontal direction in the Figures) or y-direction (direction into and out of the paper plane).

With the application of the LMD process for the second segment 3, the drawbacks accompanied by complicated support structures (see above) which would have been necessary when manufacturing the second segment 3 with e.g. SLM, can advantageously be overcome. This is because the sub-manufacture is switched from SLM to LMD, wherein the part of the component manufactured so far, (i.e. the first segment 2) can be further fabricated without the need of the mentioned support structures. Due to the switch of manufacture or sub-manufacture or the corresponding processes, it may be necessary to switch the manufacturing apparatus, i.e. the sub-component fabricated by e.g. SLM (platform 1 and/or the first segment 2) have to be mounted off the corresponding SLM apparatus and mounted into the LMD apparatus, for example (apparatuses not shown in the Figures). Alternatively, in an adequate apparatus, both processes, i.e. the manufacturing of the first segment 2 and the manufacturing of the second segment 3 may be performed in the same apparatus.

In general, it is perceivable according to the present disclosure, to switch to the LMD process at any position or level along the vertical extension of the second segment or as the case may be the component 100.

As, advantageously, different manufacturing or fabrication apparatuses are used for the presented method, the corresponding apparatuses or setups may be adjusted for easy and efficient "remounting" during the fabrication of the component or guide vane such that the manufacture of the overall component may be carried out in an efficient and easy way.

FIG. 3 shows, in a schematic, an alternative embodiment of the component manufactured by the method as described herein. In contrast to the component shown in FIG. 2, the platform 6 or base part is a pre-fabricated, pre-existing or a separate platform originating from which the component is manufactured. Thus, the pre-fabricated platform 6 is not manufactured along with the first segment 2. Said pre-existing platform nevertheless constitutes a part of the ready-manufactured component.

The inventive method as described herein may relate to hybrid style manufacturing or a hybrid style manufacturing method or a hybrid manufacturing process relating to the following problems and its solutions.

Problem A: Too much support structure due to unsuitable component shape, e.g. in the gas channel of a guide vane, when guide vane shall be produced by additive manufacturing in layer technology (see FIG. 1).

Problem B: Only layer wise powder-bed processes are today give precise enough filigree structures; LMD is often not accurate or precise enough to create final geometries without additional machining.

Problem C: The airfoil section or segment 2 built in a layer wise powder-bed system is normally of worse surface quality when built in a typical spatial 45-45 degree spatial angle—thus a lot of unwanted support structure is created. In other words, the first segment may be constructed or fabricated in the powder-bed system or apparatus in or along an oblique, e.g. 45°-, orientation.

By lots of "un-lean", dead support structure 4 (see FIG. 1), resulting in a non-economic situation to work around the fact that the upper platform 3 has a lot of projecting, overhanging or downskin surfaces that cannot be unsupported in a loose powder-bed; only way was/is to use expensive investment casting (see FIG. 1).

By using different additive manufacturing techniques combined in one single component (see FIG. 2—new manufacturing like Rapid Prototyping or FIG. 3—new manufacturing starting with a re-used or prefabricated lower platform 6 or repair):

The described method may relate to the following steps:

Step 1: Starting with a relatively simple to build platform 1 (see FIG. 2) or using a re-used lower platform 6 (see FIG. 3) and an integrated airfoil 2 (up to the level along the horizontal extension of the air foil or first segment when the unsuitable downskin area starts), the critical part of the guide vane is built layer wise in z-direction in a powder-bed process.

Step 2: Taking the partly built component out of the layer wise powder-bed process and move it to a 5-axis laser metal deposition (LMD) process (x- or y- or z-direction possible). There, the second platform 3—with the downskin areas that should be prevented—is built. By doing that, the formerly unwanted downskin areas are turned into a more favorable building direction for the 5-axis process.

Hybrid style of combined AM methods: layer wise powder-bed when optimal accuracy and surface finish is needed and combined with 5-axis LMD process to avoid support structure and bad surface quality at downskin areas.

For example, it is conceivable that the component is not embodied with a "H"-shape profile or cross-section, but may have any shape, wherein the second segment protrudes or overhangs over a side face of the first segment as described.

The invention claimed is:

1. A method of manufacturing a component comprising:
    manufacturing of a first segment for the component by a powder-bed manufacturing process, which is selected from one of the following techniques: selective laser melting, electron beam melting, selective laser sintering, wherein the first segment terminates upon formation of a final layer of heated and adhered material, and
    manufacturing of a second segment for the component such that the second segment projects by a projecting distance over at least one side face of the first segment,
    wherein the second segment is manufactured by a multi-axis manufacturing process comprising laser cladding or laser metal deposition, and
    wherein the manufacturing of the second segment is performed directly onto the first segment via the multi-axis manufacturing process.

2. The method according to claim 1,
    wherein the projecting distance amounts to at least double of a lateral dimension of the first segment.

3. The method according to claim 1,
    wherein the second segment projects over at least two opposing side faces of the first segment.

4. The method according to claim 1,
    wherein the manufacturing of the first segment is performed in a first apparatus and the manufacturing of the second segment is performed in a second apparatus being different from the first apparatus, and wherein after the manufacturing of the first segment, the first segment is mounted off the first apparatus and mounted into the second apparatus for the subsequent manufacturing of the second segment.

5. The method according to claim 1,
    wherein the first segment is manufactured onto a pre-fabricated platform.

6. The method according to claim 1,
    wherein the first segment is directly manufactured without the use of a pre-fabricated platform.

7. The method according to claim 1,
    wherein the component is or is a part of a guide vane for a turbine.

8. The method according to claim 1,
    wherein the first segment is an airfoil of a turbine.

9. The method according to claim 1, wherein the multi-axis manufacturing process is less geometrically accurate than the powder-bed manufacturing process.

10. The method according to claim 9, wherein the multi-axis manufacturing process comprises laser cladding.

11. The method according to claim 1, wherein the first segment comprises a first platform and an airfoil of a gas turbine engine component, and the second segment comprises a second platform of the gas turbine engine component disposed on an opposite side of the airfoil from the first platform.

* * * * *